(12) United States Patent
Rajagopalan

(10) Patent No.: US 7,912,936 B2
(45) Date of Patent: *Mar. 22, 2011

(54) MANAGING INTERWORKING COMMUNICATIONS PROTOCOLS

(76) Inventor: Nara Rajagopalan, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/537,898

(22) Filed: Aug. 7, 2009

(65) Prior Publication Data

US 2009/0300159 A1   Dec. 3, 2009

Related U.S. Application Data

(63) Continuation of application No. 09/663,457, filed on Sep. 13, 2000, now Pat. No. 7,574,495.

(51) Int. Cl.
*G06F 15/173* (2006.01)
*G06F 15/16* (2006.01)
*H04L 12/28* (2006.01)

(52) U.S. Cl. ......... 709/223; 709/249; 370/392; 370/409
(58) Field of Classification Search .................. None
See application file for complete search history.

(56) References Cited

U.S. PATENT DOCUMENTS

| | | | |
|---|---|---|---|
| 4,667,287 A | 5/1987 | Allen et al. |
| 4,667,323 A | 5/1987 | Engdahl et al. |
| 4,726,018 A | 2/1988 | Bux et al. |
| 5,490,252 A | 2/1996 | Macera et al. |
| 5,581,705 A | 12/1996 | Passint et al. |
| 5,598,414 A | 1/1997 | Walser et al. |
| 5,633,866 A | 5/1997 | Callon |
| 5,745,778 A | 4/1998 | Alfieri |
| 5,825,772 A | 10/1998 | Dobbins et al. |
| 5,841,973 A | 11/1998 | Kessler et al. |
| 5,841,990 A | 11/1998 | Picazzo et al. |
| 5,892,924 A | 4/1999 | Lyon et al. |
| 5,920,705 A | 7/1999 | Lyon et al. |
| 5,963,555 A | 10/1999 | Takase et al. |
| 5,964,847 A | 10/1999 | Booth et al. |
| 5,987,521 A | 11/1999 | Arrowood et al. |
| 6,014,382 A | 1/2000 | Takihiro et al. |
| 6,032,193 A | 2/2000 | Sullivan |
| 6,047,330 A | 4/2000 | Stracke |
| 6,069,895 A | 5/2000 | Ayandeh |

(Continued)

OTHER PUBLICATIONS

Chan, Mun C. et al., "An architecture for broadband virtual networks under customer control." IEEE Network Operations and Management Symposium. Apr. 1996. pp. 135-144.

(Continued)

*Primary Examiner* — Wen-Tai Lin
(74) *Attorney, Agent, or Firm* — Hamilton, DeSanctis & Cha LLP

(57) ABSTRACT

Systems and methods for managing interworking protocols are provided. According to one embodiment, a policy-based provisioning methodology is used by a service management system (SMS) to provision subscriber interfaces of service processing switches based upon parameters of a predefined policy. The subscriber interfaces communicate data in accordance with a first protocol. The parameters include a window size, a window timeout, a number of allowed bad events, an event window size and/or a keep-alive interval. Transport network interfaces, which communicate in accordance with a second protocol, are provisioned to provide a transport between the subscriber interfaces. A first-protocol-over-second-protocol (FPoSP) Virtual Private Network (VPN) is created through which the subscriber sites securely exchange data by establishing a virtual router (VR) corresponding to each subscriber interface. The VRs encapsulate packets received from the subscriber sites within packets of the second protocol and transmit the encapsulated packets through the transport network interfaces.

16 Claims, 8 Drawing Sheets

U.S. PATENT DOCUMENTS

| | | | |
|---|---|---|---|
| 6,098,110 | A | 8/2000 | Witkowski et al. |
| 6,118,791 | A | 9/2000 | Fichou et al. |
| 6,137,777 | A | 10/2000 | Vaid et al. |
| 6,169,739 | B1 | 1/2001 | Isoyama |
| 6,173,399 | B1 | 1/2001 | Gilbrech |
| 6,175,867 | B1 | 1/2001 | Taghadoss |
| 6,212,556 | B1 | 4/2001 | Arunachalam |
| 6,220,768 | B1 | 4/2001 | Barroux |
| 6,226,296 | B1 | 5/2001 | Lindsey et al. |
| 6,226,788 | B1 | 5/2001 | Schoening et al. |
| 6,243,580 | B1 | 6/2001 | Garner |
| 6,249,519 | B1 | 6/2001 | Rangachar |
| 6,256,295 | B1 | 7/2001 | Callon |
| 6,260,072 | B1 | 7/2001 | Rodriguez |
| 6,260,073 | B1 | 7/2001 | Walker et al. |
| 6,266,695 | B1 | 7/2001 | Huang et al. |
| 6,278,708 | B1 | 8/2001 | Von Hammerstein et al. |
| 6,286,038 | B1 | 9/2001 | Reichmeyer et al. |
| 6,295,297 | B1 | 9/2001 | Lee |
| 6,298,130 | B1 | 10/2001 | Galvin |
| 6,317,748 | B1 | 11/2001 | Menzies et al. |
| 6,324,583 | B1 | 11/2001 | Stevens |
| 6,330,602 | B1 | 12/2001 | Law et al. |
| 6,338,092 | B1 | 1/2002 | Chao et al. |
| 6,339,782 | B1 | 1/2002 | Gerard et al. |
| 6,424,657 | B1 | 7/2002 | Voit et al. |
| 6,434,619 | B1 | 8/2002 | Lim et al. |
| 6,449,650 | B1 | 9/2002 | Westfall et al. |
| 6,453,406 | B1 | 9/2002 | Sarnikowski et al. |
| 6,459,682 | B1 | 10/2002 | Ellesson et al. |
| 6,463,061 | B1 | 10/2002 | Rekhter et al. |
| 6,466,976 | B1 | 10/2002 | Alles et al. |
| 6,496,935 | B1 | 12/2002 | Fink et al. |
| 6,526,056 | B1 | 2/2003 | Rekhter et al. |
| 6,532,088 | B1 | 3/2003 | Dantu et al. |
| 6,542,466 | B1 | 4/2003 | Pashtan et al. |
| 6,542,515 | B1 | 4/2003 | Kumar et al. |
| 6,556,544 | B1 | 4/2003 | Lee |
| 6,608,816 | B1 | 8/2003 | Nichols |
| 6,611,498 | B1 | 8/2003 | Baker et al. |
| 6,611,522 | B1 | 8/2003 | Zheng et al. |
| 6,625,169 | B1 | 9/2003 | Tofano |
| 6,631,519 | B1 | 10/2003 | Nicholson et al. |
| 6,636,516 | B1 | 10/2003 | Yamano |
| 6,639,897 | B1 | 10/2003 | Shiomoto et al. |
| 6,658,013 | B1 | 12/2003 | de Boer et al. |
| 6,668,282 | B1 | 12/2003 | Booth et al. |
| 6,697,359 | B1 | 2/2004 | George |
| 6,697,360 | B1 | 2/2004 | Gai et al. |
| 6,738,371 | B1 | 5/2004 | Ayres |
| 6,763,236 | B2 | 7/2004 | Siren |
| 6,775,267 | B1 | 8/2004 | Kung et al. |
| 6,775,284 | B1 | 8/2004 | Calvignac et al. |
| 6,785,691 | B1 | 8/2004 | Hewett et al. |
| 6,807,181 | B1 | 10/2004 | Weschler |
| 6,816,462 | B1 | 11/2004 | Booth et al. |
| 6,856,676 | B1 | 2/2005 | Pirot et al. |
| 6,868,082 | B1 | 3/2005 | Allen et al. |
| 6,922,774 | B2 | 7/2005 | Meushaw et al. |
| 6,938,097 | B1 | 8/2005 | Vincent |
| 6,944,128 | B2 | 9/2005 | Nichols |
| 6,944,168 | B2 | 9/2005 | Paatela et al. |
| 6,954,429 | B2 | 10/2005 | Horton et al. |
| 6,959,194 | B2 | 10/2005 | Brouwer et al. |
| 6,985,438 | B1 | 1/2006 | Tschudin |
| 6,985,956 | B2 | 1/2006 | Luke et al. |
| 7,020,143 | B2 | 3/2006 | Zdan |
| 7,042,843 | B2 | 5/2006 | Ni |
| 7,042,848 | B2 | 5/2006 | Santiago et al. |
| 7,054,291 | B2 | 5/2006 | Balazinski et al. |
| 7,054,311 | B2 | 5/2006 | Norman et al. |
| 7,068,656 | B2 | 6/2006 | Sainomoto et al. |
| 7,082,477 | B1 | 7/2006 | Sadhasivam et al. |
| 7,089,293 | B2 | 8/2006 | Grosner et al. |
| 7,096,383 | B2 | 8/2006 | Talaugon et al. |
| 7,096,495 | B1 | 8/2006 | Warrier et al. |
| 7,127,049 | B2 | 10/2006 | Godse et al. |
| 7,159,035 | B2 | 1/2007 | Garcia-Luna-Aceves et al. |
| 7,161,904 | B2 | 1/2007 | Hussain et al. |
| 7,187,676 | B2 | 3/2007 | DiMambro |
| 7,197,553 | B2 | 3/2007 | Roberts et al. |
| 7,225,259 | B2 | 5/2007 | Ho et al. |
| 7,266,120 | B2 | 9/2007 | Cheng et al. |
| 7,272,643 | B1 | 9/2007 | Sarkar et al. |
| 7,313,614 | B2 | 12/2007 | Considine et al. |
| 7,324,489 | B1 | 1/2008 | Iyer |
| 7,574,495 | B1 | 8/2009 | Rajagopalan et al. |
| 7,639,632 | B2 | 12/2009 | Sarkar et al. |
| 2001/0024425 | A1 | 9/2001 | Tsunoda et al. |
| 2001/0033580 | A1 | 10/2001 | Dorsey et al. |
| 2001/0034733 | A1 | 10/2001 | Prompt et al. |
| 2001/0043571 | A1 | 11/2001 | Jang et al. |
| 2001/0052013 | A1 | 12/2001 | Munguia et al. |
| 2002/0071389 | A1 | 6/2002 | Seo |
| 2002/0075901 | A1 | 6/2002 | Perlmutter et al. |
| 2002/0099849 | A1 | 7/2002 | Alfieri et al. |
| 2002/0150093 | A1 | 10/2002 | Ott et al. |
| 2002/0150114 | A1 | 10/2002 | Sainomoto et al. |
| 2002/0152373 | A1 | 10/2002 | Sun et al. |
| 2002/0186661 | A1 | 12/2002 | Santiago et al. |
| 2003/0012209 | A1 | 1/2003 | Abdelilah et al. |
| 2003/0033401 | A1 | 2/2003 | Poisson et al. |
| 2003/0063590 | A1 | 4/2003 | Mohan et al. |
| 2003/0108041 | A1 | 6/2003 | Aysan et al. |
| 2003/0115308 | A1 | 6/2003 | Best et al. |
| 2003/0117954 | A1 | 6/2003 | De Neve et al. |
| 2003/0169747 | A1 | 9/2003 | Wang |
| 2003/0200295 | A1 | 10/2003 | Roberts et al. |
| 2003/0212735 | A1 | 11/2003 | Hicok et al. |
| 2003/0223406 | A1 | 12/2003 | Balay |
| 2004/0141521 | A1 | 7/2004 | George |
| 2004/0160900 | A1 | 8/2004 | Lund et al. |
| 2004/0199567 | A1 | 10/2004 | Lund |
| 2004/0199568 | A1 | 10/2004 | Lund |
| 2004/0199569 | A1 | 10/2004 | Kalkunte et al. |
| 2005/0002417 | A1 | 1/2005 | Kelly et al. |
| 2005/0055306 | A1 | 3/2005 | Miller et al. |
| 2005/0081059 | A1 | 4/2005 | Bandini et al. |
| 2005/0083955 | A1 | 4/2005 | Guichard et al. |
| 2005/0108340 | A1 | 5/2005 | Gleeson et al. |
| 2005/0113114 | A1 | 5/2005 | Asthana |
| 2005/0243798 | A1 | 11/2005 | Dunn et al. |
| 2006/0087969 | A1 | 4/2006 | Santiago et al. |
| 2006/0206713 | A1 | 9/2006 | Hickman et al. |
| 2007/0147368 | A1 | 6/2007 | Desai et al. |
| 2008/0028456 | A1 | 1/2008 | O'Rourke et al. |
| 2008/0259936 | A1 | 10/2008 | Hussain et al. |
| 2008/0317040 | A1 | 12/2008 | Balay et al. |
| 2008/0317231 | A1 | 12/2008 | Balay et al. |
| 2008/0320553 | A1 | 12/2008 | Balay et al. |
| 2009/0007228 | A1 | 1/2009 | Balay et al. |
| 2009/0073977 | A1 | 3/2009 | Hussain et al. |
| 2009/0225759 | A1 | 9/2009 | Hussain et al. |
| 2009/0238181 | A1 | 9/2009 | Desai et al. |
| 2009/0279567 | A1 | 11/2009 | Ta et al. |
| 2010/0094980 | A1 | 4/2010 | Sarkar et al. |
| 2010/0142527 | A1 | 6/2010 | Balay et al. |
| 2010/0146627 | A1 | 6/2010 | Lin |
| 2010/0189016 | A1 | 7/2010 | Millet |

OTHER PUBLICATIONS

Chan, Mun C. et al "Customer Management and Control of Broadband VPN Services." Proc. Fifth IFIP/IEEE International Symposium of Integrated Network Management. May 1997. pp. 301-314.

Gasparro, D.M., "Next-Gen VPNs: The Design Challenge." Data Communications. Sep. 1999. pp. 83-95.

Hanaki, M. et al., "LAN/WAN management integration using ATM CNM interface." IEEE Network Operations Management Symposium, vol. 1. Apr. 1996. pp. 12-21.

Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.

Keshav, S., "An Engineering Approach to Computer Networking: ATM networks, the internet, and the telephone network." Reading Mass: Addison-Wesley, Addison-Wesley Professional Computing Series. 1992. pp. 318-324.

Kim, E.C. et al., "The Multi-Layer VPN Management Architecture." Proc. Sixth IFIP/IEEE International Symposium on Integrated Network Management. May 1999. pp. 187-200.

Rao, J.R., "Intranets and VPNs: Strategic Approach." 1988 Annual Review of Communications. 1998. pp. 669-674.

Tanenbaum, A.S., "Computer Networks." Upper Saddle River, N. J.: Prentice Hall PTR, 3rd Edition. 1996. pp. 348-364.

European Search Report for PCT/US03/37009 (Jul. 4, 2004) 2 pgs.

International Search Report for PCTUS03/17674. 6 pgs.

Office Action dated Nov. 28, 2007 for U.S. Appl. No. 09/952,520.

Office Action dated Oct. 16, 2007 for U.S. Appl. No. 09/661,130.

Office Action dated Oct. 18, 2007 for U.S. Appl. No. 09/663,483.

IEEE Potentials Publication; "Local Area Networks" Dec. 95/Jan. 96; pp. 6. http://www.ece.uc.edu/-paw/potentials/sample.

Lawrence, J. Lang et al. "Connecting Remote FDDI Installations with Single-Mode Fiber, Dedicated Lines, or SMDS." Jul. 1990; ACM SIGCOMM Computer Communication Review. vol. 20, Issue 3; pp. 72-82.

Non-Final Office Action for U.S. Appl. No. 11/849,352 mailed Jul. 17, 2009.

Non-Final Office Action for U.S. Appl. No. 10/991,970 mailed May 18, 2009.

Non-Final Office Action for U.S. Appl. No. 10/991,969 mailed Apr. 27, 2009.

Non-Final Office Action for U.S. Appl. No. 11/684,614 mailed Apr. 24, 2009.

Non-Final Rejection for U.S. Appl. No. 12/202,232 mailed Mar. 23, 2010.

Non-Final Rejection for U.S. Appl. No. 12/202,223 mailed Mar. 3, 2010.

Non-Final Rejection for U.S. Appl. No. 12/260,524 mailed Mar. 17, 2010.

Non-Final Rejection for U.S. Appl. No. 12/259,296 mailed Mar. 9, 2009.

Non-Final Rejection for U.S. Appl. No. 12/202,224 mailed on Apr. 16, 2010.

Non-Final Rejection for U.S. Appl. No. 12/140,249 mailed on Mar. 31, 2010.

Non-Final Rejection for U.S. Appl. No. 12/202,333 mailed Jun. 21, 2010.

Non-Final Rejection for U.S. Appl. No. 11/557,096, mailed Jun. 30, 2010.

Non-Final Rejection for U.S. Appl. No. 11/460,977, mailed Jul. 2, 2010.

Non-Final Office Action for U.S. Appl. No. 11/849,352 mailed Jul. 17, 2009.

Non-Final Office Action for U.S. Appl. No. 10/991,970 mailed May 18, 2009.

Final Rejection for U.S. Appl. No. 11/537,609 mailed Nov. 17, 2009.

US 7,912,936 B2

MANAGING INTERWORKING COMMUNICATIONS PROTOCOLS

This application is a continuation of U.S. patent application Ser. No. 09/663,457, filed Sep. 13, 2000, now U.S. Pat. No. 7,574,495, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2000-2009, Fortinet, Inc.

BACKGROUND

1. Field

Embodiments of the present invention generally relate to computer network routers. In particular, embodiments of the present invention relate to systems and methods of managing interworking protocols for such routers.

2. Description of the Related Art

As computer networking technology has evolved, a number of different communications protocols have been developed. For example, Transmission Control Protocol (TCP)/Internet Protocol (IP), Frame Relay, Asynchronous Transfer Mode (ATM) protocols currently exist, along with other communications protocols. Each of these protocols has different defining characteristics, such as supported bandwidth, reliability and communications distances. It is often desirable to have two or more protocols work together. In previous systems, configuring a network to support such interworking protocols is largely a manual process, prone to errors, and in general difficult to accomplish.

SUMMARY

Systems and methods are described for managing interworking protocols. According to one embodiment, a method is provided for managing interworking protocols. A policy-based provisioning methodology is used by a service management system (SMS), communicatively coupled with service processing switches of a service provider and operable to automatically establish a logical network connection among multiple subscriber sites, to provision subscriber interfaces of the service processing switches based upon parameters of a predefined policy. The subscriber interfaces are configured to communicate data in accordance with a first protocol. The parameters include a window size, a window timeout, a number of allowed bad events, an event window size and/or a keep-alive interval. Transport network interfaces of the service processing switches are provisioned by the SMS to provide a transport between the subscriber interfaces. The transport network interfaces communicate in accordance with a second protocol. A first-protocol-over-second-protocol (FPoSP) Virtual Private Network (VPN) is created by the SMS through which the subscriber sites securely exchange data by establishing a virtual router (VR) within the service processing switches corresponding to each subscriber interface. The VRs communicate the data between the service processing switches by encapsulating packets received from the subscriber sites within packets of the second protocol and transmitting the encapsulated packets through the transport network interfaces.

In the aforementioned embodiment, the first protocol may be a frame relay protocol or an Asynchronous Transfer Mode (ATM) protocol.

In various instances of the aforementioned embodiments, the second protocol may be a Transmission Control Protocol/Internet Protocol (TCP/IP) protocol or an Internet Protocol Security (IPSec) protocol.

In the context of various of the aforementioned embodiments, provisioning the transport network interfaces may involve use of the parameters from the predefined policy.

Other embodiments of the present invention provide a service processing system including a first service processing switch, a second service processing switch and a service management system (SMS). The first service processing switch including multiple processing elements. The second service processing switch including multiple processing elements. The SMS is communicably coupled to the first service processing switch and the second service processing switch and is operable to automatically establish a logical network connection between subscriber sites associated with the first service processing switch and the second service processing switch. The first subscriber interface of the first service processing switch is provisioned using a policy-based provisioning methodology based upon parameters of a predetermined policy definition. The first subscriber interface is configured to communicate data in accordance with a first protocol. The parameters include a window size, a window timeout, a number of allowed bad events, an event window size and/or a keep-alive interval. A second subscriber interface of the second service processing switch is provisioned using the policy-based provisioning methodology based upon the parameters of the predetermined policy definition. The second subscriber interface is configured to communicate data in accordance with the first protocol. Transport network interfaces of the first service processing switch and the second service processing switch are provisioned to provide a transport between the first subscriber interface and the second subscriber interface. The transport network interfaces communicate in accordance with a second protocol. A first-protocol-over-second-protocol (FPoSP) Virtual Private Network (VPN) is created through which the subscriber sites securely exchange data by establishing a first virtual router (VR) corresponding to the first subscriber interface and a second VR corresponding to the second subscriber interface. The VRs communicate the data between the service processing switches by encapsulating packets received from the subscriber sites within packets of the second protocol and transmitting the encapsulated packets through the transport network interfaces.

In the aforementioned embodiment, the first protocol may be a frame relay protocol or an Asynchronous Transfer Mode (ATM) protocol.

In various instances of the aforementioned embodiments, the second protocol may be a Transmission Control Protocol/Internet Protocol (TCP/IP) protocol or an Internet Protocol Security (IPSec) protocol.

Other embodiments of the present invention provide a computer-readable storage medium having stored thereon instructions, which when executed by one or more processors of a service management system (SMS) of a service provider that is operable to automatically establish a logical network connection among subscriber sites through multiple service processing switches to which the SMS is communicatively coupled, cause a method to be performed for managing interworking protocols. Subscriber interfaces of the service processing switches are provisioned using a policy-based provisioning methodology based upon parameters of a predefined policy. The subscriber interfaces are configured to communicate data with corresponding subscriber sites of the subscriber sites in accordance with a first protocol. The parameters include a window size, a window timeout, a number of allowed bad events, an event window size and/or a keep-alive interval. Transport network interfaces of the service processing switches are provisioned to provide a transport between the subscriber interfaces. The transport network interfaces communicate in accordance with a second protocol. A first-protocol-over-second-protocol (FPoSP) Virtual Private Network (VPN) through which the subscriber sites securely exchange data is created by establishing a virtual router (VR) within the service processing switches for each of the subscriber interfaces. The VRs communicate the data between the service processing switches by encapsulating packets received from the subscriber sites within packets of the second protocol and transmitting the encapsulated packets through the transport network interfaces.

In the aforementioned embodiment, the first protocol may be a frame relay protocol or an Asynchronous Transfer Mode (ATM) protocol.

In various instances of the aforementioned embodiments, the second protocol may be a Transmission Control Protocol/Internet Protocol (TCP/IP) protocol or an Internet Protocol Security (IPSec) protocol.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

The detailed description is divided into multiple sections. In the first section the hardware and operating environment of different embodiments of the invention is described. In the second section, the software environment of varying embodiments of the invention is described. In the final section, a conclusion is provided.

Figure 1:
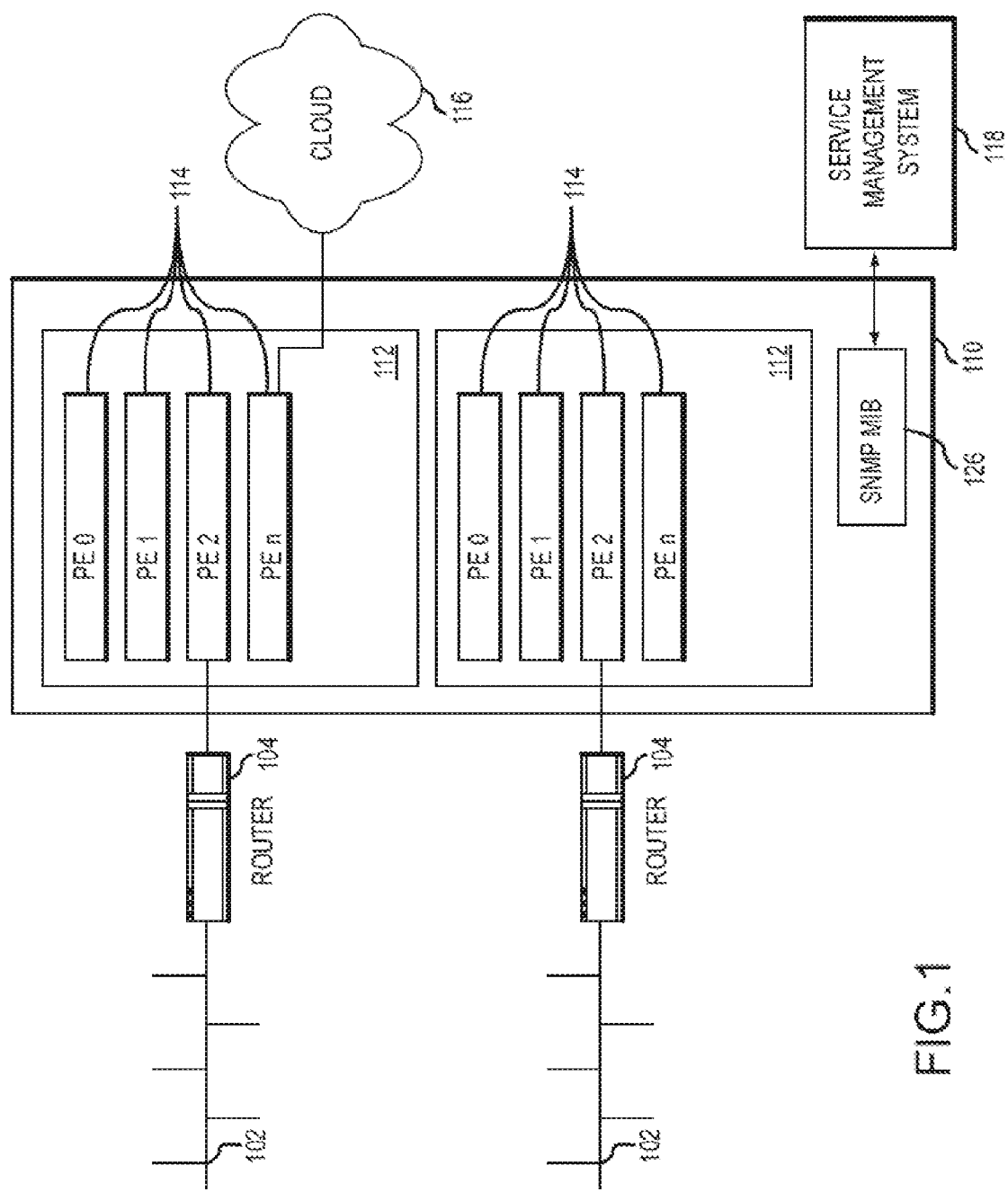
FIG. 1 is a block diagram of a hardware and operating environment in which various embodiments of the present invention may be practiced.

FIG. 1 is a diagram of a hardware and operating environment in conjunction with which embodiments of the invention may be practiced. The description of FIG. 1 is intended to provide a brief, general description of suitable computer routing hardware and a suitable computing environment in conjunction with which the invention may be implemented.

Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

As shown in FIG. 1, the system 100 includes a service processing switch 110, access routers 104, service management system 118, and customer network management system 106. In some embodiments, service processing switch 110 provides switching, routing and computing resources that can be allocated by a service provider to customers. In one embodiment, the service processing switch 110 is an IPSX 9000 service processing switch from Cosine Communications, Inc. However, the invention is not limited to any particular switch, router or service processing hardware.

Service processing switch 110 can contain one or more blades 112. In some embodiments of the invention, blades 112 have a type associated with them. Examples of blade types include, processing functions such as network blades, control blades, trunk blades, and processor blades. Network blades provide interfaces to different types of networks. Control blades provide system management and accounting functions to the service processing system 110. Trunk blades provide access to high speed trunk networks. Processor blades provide general purpose computer processors that in some embodiments of the invention provide firewall, intrusion detection, or directory services. Blades are communicably coupled to one another, in one embodiment a packet ring is used to couple the blades.

In some embodiments, each of blades 112 includes one more processing elements 114. Processing elements 114 include a CPU and memory that provide computing resources for the blade. The invention is not limited to any particular number of processing elements on a blade, nor is the invention limited to any particular number of blades in a service processing switch 110.

Service processing system 110 is typically communicably coupled to a network 116, for example the Internet. Network 116 can also be a Wide Area Network (WAN), a Local Area Network (LAN), or a private network.

Service processing system 110 is also typically communicably coupled to a plurality of customer networks 102 via customer access routers 104.

Service management system 118 is communicably coupled to service processing system 110, and hosts software that is used to configure and control the operation of service processing switch 110. In one embodiment of the invention, the service management system is a SPARC system available from Sun Microsystems, Inc. running the Invision product from Cosine Communications, Inc. Service management system 118 can be used to define and allocate resources within service processing switch 110 to various customers. In some embodiments, the Simple Network Management Protocol (SNMP) is used to communicate with the service processing system 110 and to update SNMP MIB 126.

Figure 2:
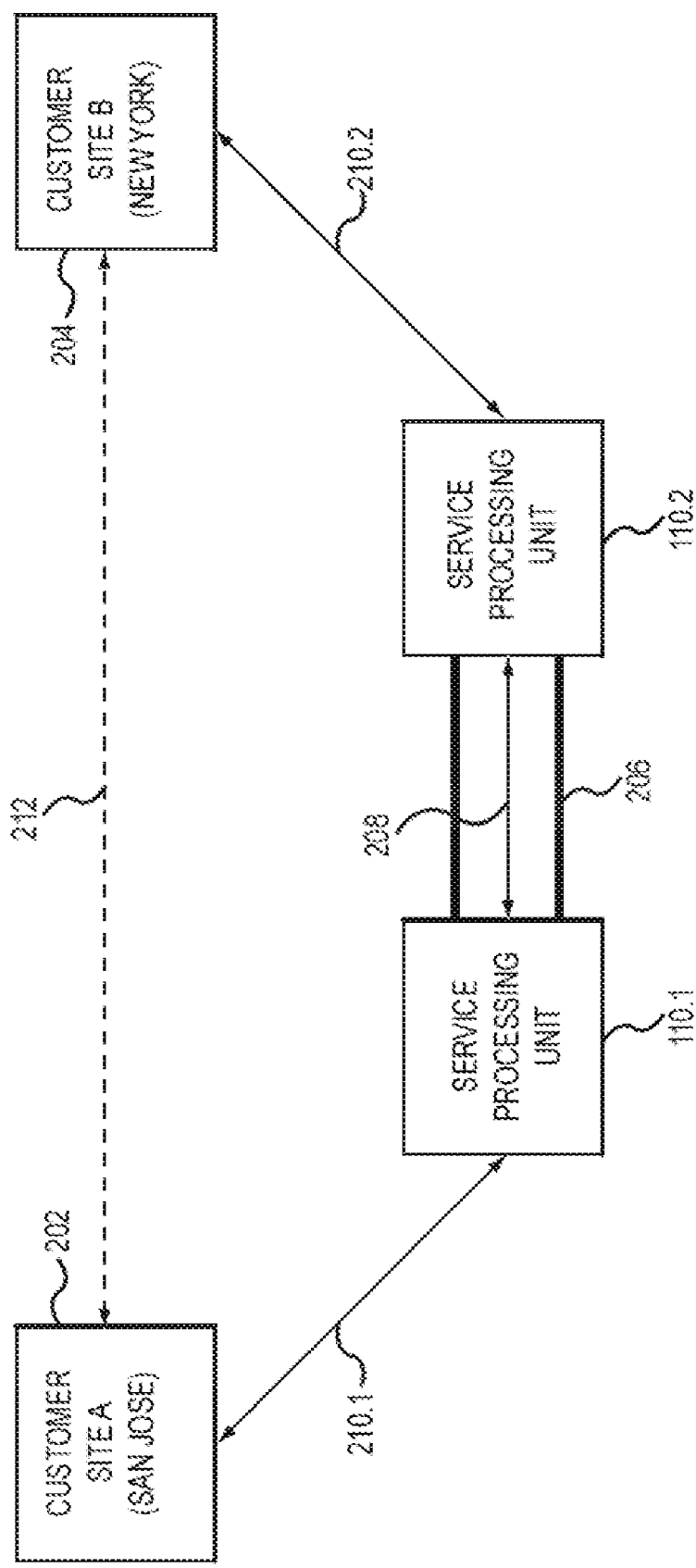
FIG. 2 is a block diagram illustrating an exemplary frame of IP configuration according to an embodiment of the present invention.

FIG. 2 illustrates an exemplary configuration in which two network protocols interwork. In the exemplary configuration, a customer manages two sites A and B, 202 and 204 respectively, and wishes to establish a logical network connection 212 between the two. In the exemplary scenario, the customer desires to use Frame Relay protocols in and out of the two sites. However, it is impractical to establish a Frame Relay link directly between the two sites. As a result, the customer establishes a Frame Over IP (FRoIP) link between the two sites 202 and 204. In order to establish this link, two service processing switches 110.1 and 110.2 are used. Switch 110.1 is located near site 202, and switch 110.2 is located near site 204, allowing a Frame Relay link to be established between each of the sites and its corresponding switch. Transport 208 is used to communicably couple switches 110.1 and 110.2, and a private virtual circuit (PVC) 206 is established within transport 208. The end result is that a FRoIP connection between the switches 110.1 and 110.2 allows Frame Relay packets to be transmitted between sites 202 and 204.

Those skilled in the art will appreciate that the invention may be practiced with other routing system hardware configurations besides those described above.

Figure 3:
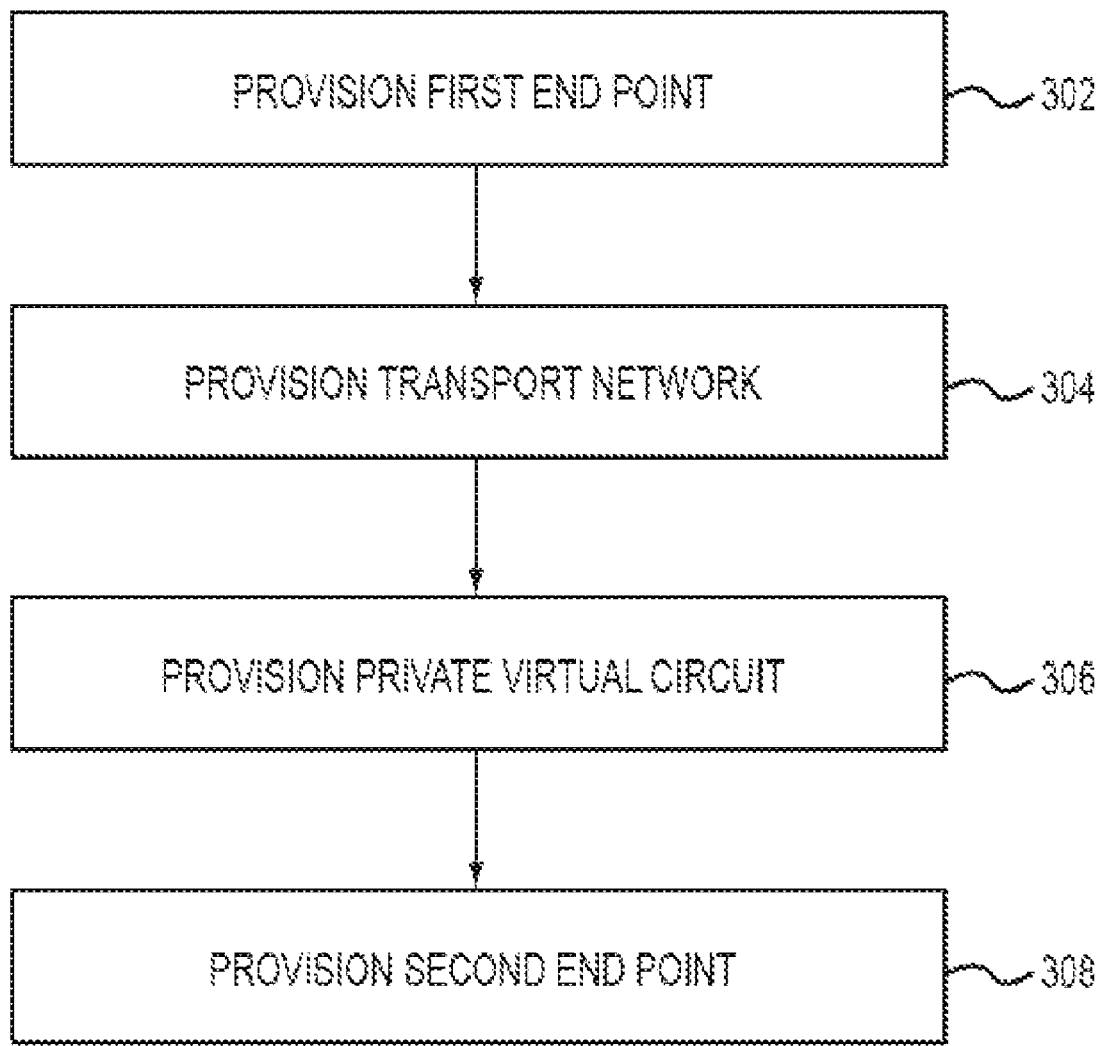
FIG. 3 is a flowchart illustrating a method according to an embodiment of the present invention.

In the previous section, a system level overview of the operation of exemplary embodiments of the invention were described. In this section, the particular methods of the invention performed by an operating environment executing an exemplary embodiment are described with reference to a flowchart in FIG. 3. The methods to be performed by the operating environment constitute computer programs made up of computer-executable instructions. Describing the methods with reference to a flow chart enables one skilled in the art to develop such programs including such instructions to carry out the methods on suitable computers (the processor of the computer executing the instructions from computer-readable media). The methods described below are inclusive of the acts required to be taken by an operating environment executing an exemplary embodiment of the invention.

The method begins when a system executing the method, such as service management system 118 provisions a first endpoint for an interworking protocol (block 302). Depending upon the particular embodiment, the provisioning of the endpoint can be accomplished either manually, or it can be accomplished using the policy based provisioning methodologies described below, such as those described with reference to FIG. 8.

Next, the system proceeds to provision the transport network (block 304). Again, the transport network interfaces can be provisioned using predefined policies. In the case of Frame Over IP (FRoIP) provisioning, one embodiment of the invention includes the following parameters that can be determined by policies:

Default window-size—the window size determines the length of the buffered packet sequence. It enables the FRoIP instance to hold a series of IP packets in a memory buffer, in preparation for reassembly of the original frame sequence that is ultimately sent to its destination DLCI. The default-window-size applies to all subsequent FRoIP transports that are created. If this value is changed after some transports already exist, only subsequent newly created transports will use the new default. The default value is 4 packets, and permissible values range from 1 to 10.

Default window-timeout—the window-timeout sets the time limit for holding packets in the buffer before they are sent to their destination. It is measured in milliseconds. The default value is 10,000 milliseconds or 10 seconds total. As with default window-size, this value is used as a global default for all transports.

Max-transport—the maximum number of transports that can be terminated at the FRoIP instance. The default value is 24. The number of transports that can be run depends on the load in the system, and on the particular blade.

Local VI—the Virtual Interface, identified by its number, across which the Frame Relay traffic is to be carried. This value cannot be changed while active Frame Relay transports are running.

Permit-bad-event—the number of allowed bad events, such as a failure to reassemble a frame, that are permitted before the service processing switch declares the FRoIP transport to be taken down by the switch. The same number is used as a criterion for re-enabling the transport. See event-window-size below for more details. The default is 3 events.

Event-window-size—this feature interacts with the permit-bad-event setting. In other words, if a number of events <event-window-size> occurs that is carrying a <permitbad-event> number of bad events, the transport is taken down by the Control Blade. For example, if for every 10 events three or more events are bad, the interface (transport) is marked as down. Conversely, if three or more events subsequently are known as good in a following sequence, the interface is re-enabled by the Control Blade. Thus, this setting operates for both states: good events and bad events.

Keep-alive-period—the keep-alive interval is the period of time between issued "keep this Frame Relay connection live" messages from the local transport. This value is specified in seconds.

Admin-status—admin-status is a switch that enables or disables FRoIP Transport configuration on the current switch. The default is enabled.

Window-size—this value corresponds to the default-window-size value that is specified at the FRoIP level. If you change this value, it overrides the FRoIP default-window-size value for the local transport, otherwise it automatically uses the default window-size value previously defined in the FRoP level.

Window-timeout—this value corresponds to the default-window-timeout value that is specified at the FRoP level, and overrides the default value as described for window-size.

Next, a private virtual circuit is provisioned (block 306). Again, a user can select from a set of predefined policies in order to supply configuration parameters related to the provisioning. In one embodiment of the invention, the following transport parameters can be set using policies:

| BC | Committed Burst Size |
|---|---|
| BE | Excess Burst Size |
| CIR | Committed Information Rate |

Finally, a second end point is provisioned (block 308). Like the other previously described blocks, the second end point can be provisioned using predefined policies.

Systems and methods for managing interworking communications protocols are disclosed. Embodiments of the invention provide advantages over previous systems. For example, policies can be used to make it easier to provision the various components of an interworking networking system, reducing or eliminating the need for manual configuration.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

Figure 4:
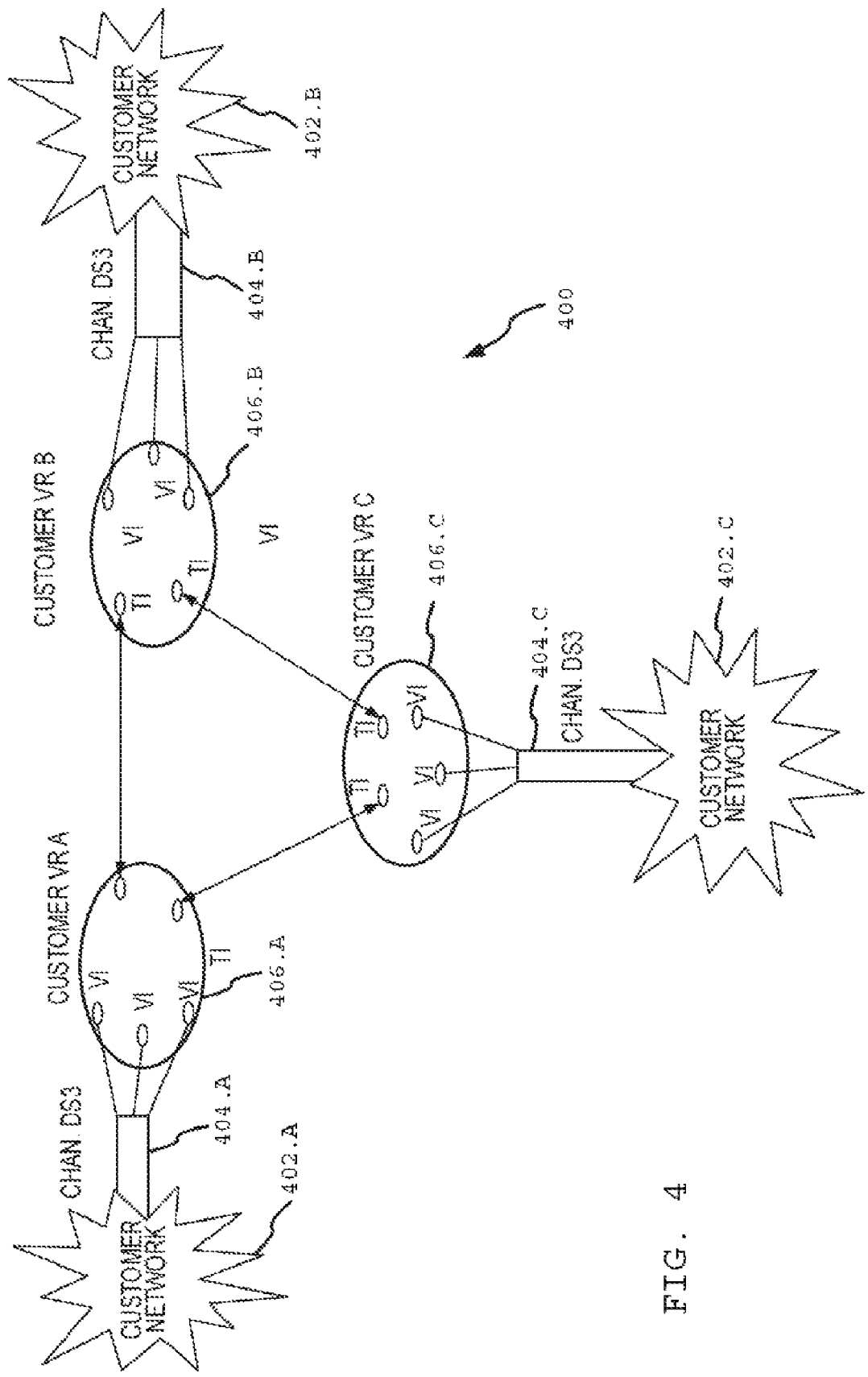
FIG. 4 is a diagram illustrating an exemplary Virtual Private Network (VPN) used in an embodiment of the invention.

FIG. 4 provides an illustration of a VPN as used in various embodiments of the invention. A VPN is typically a logical grouping of virtual routers (VRs) 406. The connectivity between VPNs and customer sites 402 is provided by means of virtual interfaces (VIs). Users can create VIs and connect them to customer sites or to VIs of other VRs. The virtual connection can also be configured to be a tunnel interface (TI) to a type of secured tunnel, such as an IPSec tunnel. Customer sites can be connected via a network interface 404, which can be a leased line interface such as DS3. The invention is not limited to any particular type of network interface.

Figure 5:
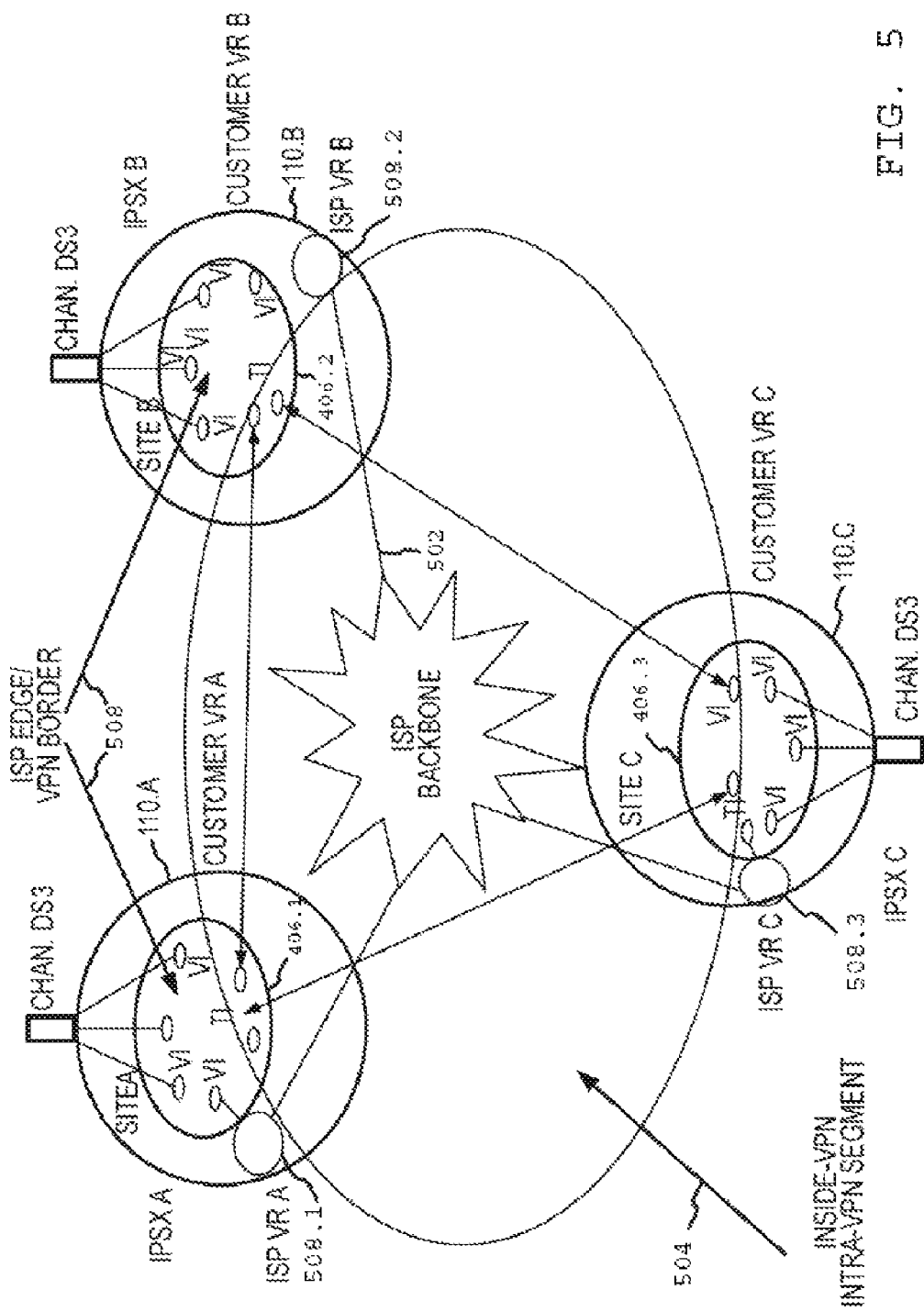
FIG. 5 is a diagram illustrating further details regarding segments of an exemplary VPN used in accordance with various embodiments of the present invention.

In some embodiments of the invention, two types of virtual routers are supported, customer VRs and ISP VRs. Customer VRs are used to build customer VPNs, and ISP VRs are used to build ISP VPN. The ISP VPN is connected to an ISP backbone network 510 (FIG. 5). In this framework, each ISP needs only one ISP VPN. Customer VRs can be connected to the ISP VPN by means of VIs. Every virtual router can use one or more routing protocols, including STATIC, RIP, OSPF, and BGP, to disseminate reachability information. For routing purposes, every VPN based on this framework can be treated as an extension of the customer network.

Various embodiments of the invention allow network managers to define profiles. The profile information may be used to automatically generate the routing configuration for a VPN. In some embodiments, to profile the routing on a VPN, a customer VPN is divided into three segments, which are illustrated in FIG. 5.

ISP-Edge segment 305 is a VPN segment that connects the VPN to customer sites. This segment includes all virtual interfaces connected to logical interfaces and tunnel interfaces whose remote end is outside the VPN. This segment is used for disseminating customer site reachability information.

Inside-VPN segment 504 (also referred to as an Intra-VPN segment) is a VPN segment that provides connectivity among different VRs 406. This segment is used to disseminate intra-VPN reachability information.

Inter-VPN segment 502 is a VPN segment that connects different types of VPNs; for example, the interfaces that connect a customer VPN with an ISP VPN.

It is desirable to identify segment types, because it provides a mechanism for generating profiles that can be optimized depending on the segment type.

Figure 6:
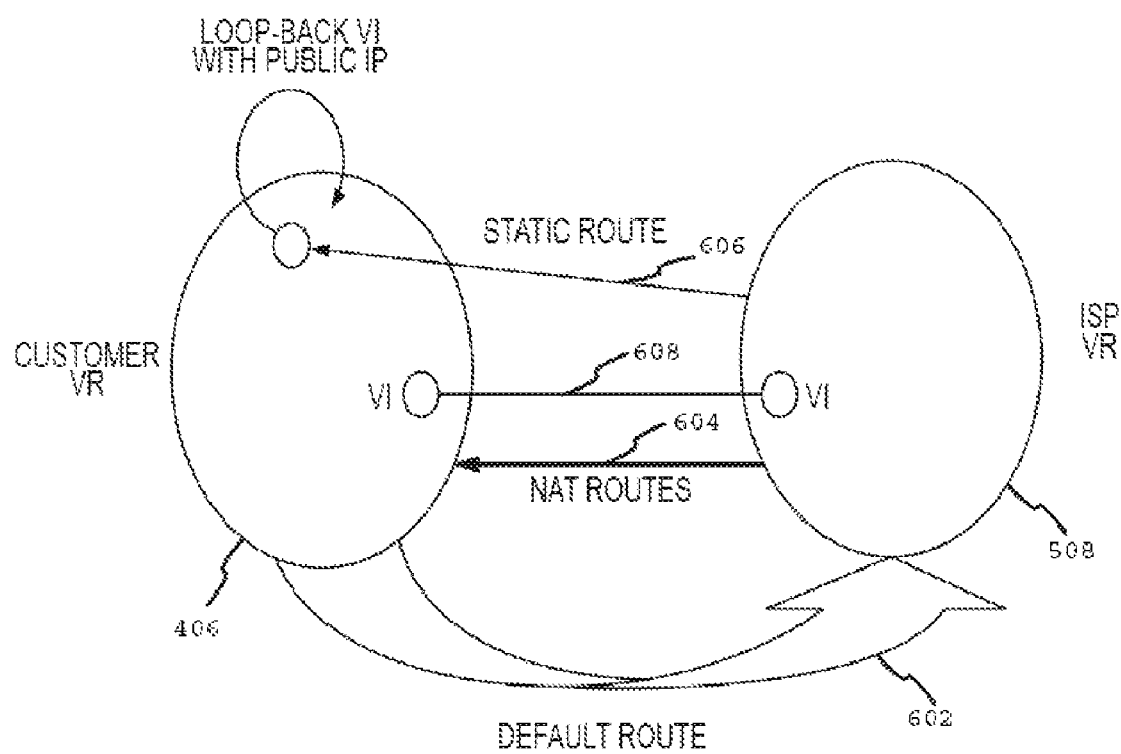
FIG. 6 is a diagram illustrating inter-VPN reachability according to one embodiment of the present invention.
Figure 7:
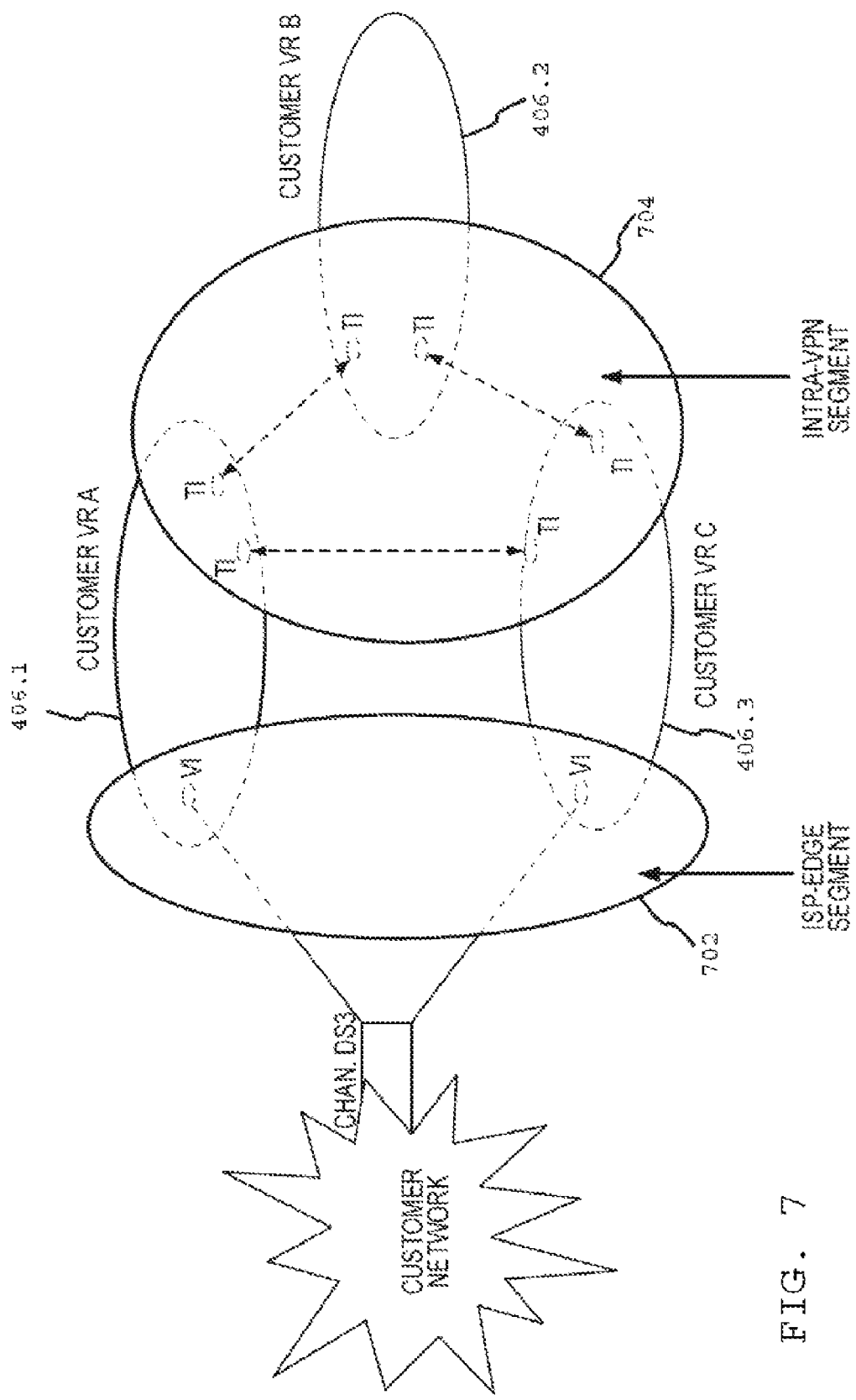
FIG. 7 is a diagram illustrating dynamic intra-VPN routing according to one embodiment of the present invention.

FIG. 6 illustrates how the routing needs of the Inter-VPN segment 302 may be taken care of at the time a customer VR 406 is created. When a customer VR 406 is created, the user is given the option to automatically connect the VR with an ISP VR 508. At that time, service management system 118 (FIG. 1) may also create a default route 602 on the customer VR 406 and a static route 606 on the ISP VR 508, which accommodates customer VR 406 to ISP VR 508 connectivity. In this model, in accordance with one embodiment, for all network address translation (NAT) addresses 604, the user adds static routes on the ISP VPN.

The profile discussed here takes care of the first two VPN segments: ISP-Edge 506 and Intra-VPN 504. Given a VPN's routing requirements, there are typically three routing aspects that are considered:

1) The routing protocol that should be turned on a virtual interface in a VR
2) When and how to redistribute routes between various routing protocols.
3) When enabling a routing protocol on a router or interface, the routing parameters to use for optimizing performance.

Service management system 118 (FIG. 1) uses VPN profile data to automatically generate the required routing configuration. In some embodiments of the invention, Border Gateway Protocol (BGP) is excluded as a possible choice for configuring customer VPNs. There are a few reasons for this. First, there are only two cases in which BGP would be used in a VPN environment. ISP-VPNs might use BGP to talk to the Internet core. Also, if a VPN connects two very large customer sites, BGP might be needed for the Intra-VPN segment to ensure scalability. There will generally be very few ISP VPNs (in most networks, there is only one), and it's unlikely that a VPN will be used to connect two or more large sites.

The second reason for excluding BGP from the profile is the VR-specific customization that is required to make BGP work in a VPN environment. Because BGP connects ISP VRs to the ISP core, a careful selection of export and import policies is needed to minimize the number of routes in each ISP VR. It is very difficult to represent this type of configuration by means of a generic routing profile. Service management system 118 (FIG. 1) provides an interface to configure BGP on VRs. This interface allows user to enable BGP on a VR, set its BGP neighbors, and add import and export policies.

In some embodiments of the invention, the profile defines a simple routing configuration, that is, static routing for the Intra-VPN segment. Thus, static routing will be used to communicate with each customer site. This configuration is desirable because it puts a minimum load on the device, thus increasing the number of VPNs that can be managed by each service processing switch 110.

There are two issues with static routing. First, ISPs need to manage static routes for each customer. As new subnets are added to customer networks and old ones are removed, the static routes corresponding to these subnets should be added or removed in the corresponding VPNs. In some embodiments, this problem can be solved by having service management system 118 (FIG. 1) take ownership of automatically managing static routes based on the customer site subnet information. In these cases, customers can directly add or remove subnet information using tools such as the customer network management system 106 (FIG. 1). This capability will transfer the ownership of managing routing to customers.

A second issue with static routing is that the routing by definition is STATIC. If a site interface is down, traffic cannot be re-routed to an alternate path. A partial solution to this problem can be provided by allowing customers to disable routing on a site that is down. This can be done by means of customer network management system 106 (FIG. 1). In this scenario, service management system 118 (FIG. 1) would remove the static routes from the network that belongs to the site that is down. This action would allow the traffic to go through the backup path.

To resolve the two issues described above, embodiments of the invention provide a mechanism for a user to choose more advanced routing options in profiles. For smaller sites, a viable option is Routing Information Protocol (RIP), while larger sites operators might choose Open Shortest Path First (OSPF) gateway protocol. The dynamic routing transfers the burden of managing route changes from the network manager to the device. If a user selects dynamic routing at the edge, then the service management system will also have to use dynamic routing to disseminate Intra-VPN reach ability information.

FIG. 5 illustrates this scenario. If a site link to virtual router A 206.1 is down, virtual router B 206.2 will know that the traffic going through that link needs to be rerouted to virtual router C 206.3 only if dynamic routing is specified for Intra-VPN segment 504.

If all the sites (ISP-Edge segment) are using static or RIP routing, service management system 118 will allow the user to choose between RIP and OSPF for Intra-VPN routing. The user will typically select RIP if there are relatively few VRs in the VPN. Because OSPF is more scalable, it is a logical choice for bigger VPNs. If a user decides to run OSPF at a site edge, it is desirable to select OSPF for the Intra-VPN segment.

This section has described the various software components in a system that provides for the automatic generation and provisioning of routing configurations. As those of skill in the art will appreciate, the software can be written in any of a number of programming languages known in the art, including but not limited to C/C++, Java, Visual Basic, Smalltalk, Pascal, Ada and similar programming languages. Embodiments of the present invention are not limited to any particular programming language for implementation. Additionally, as the generation and provisioning of routing configurations may also include manual steps, embodiments of the present invention are not limited to wholly automated methods.

Figure 8:
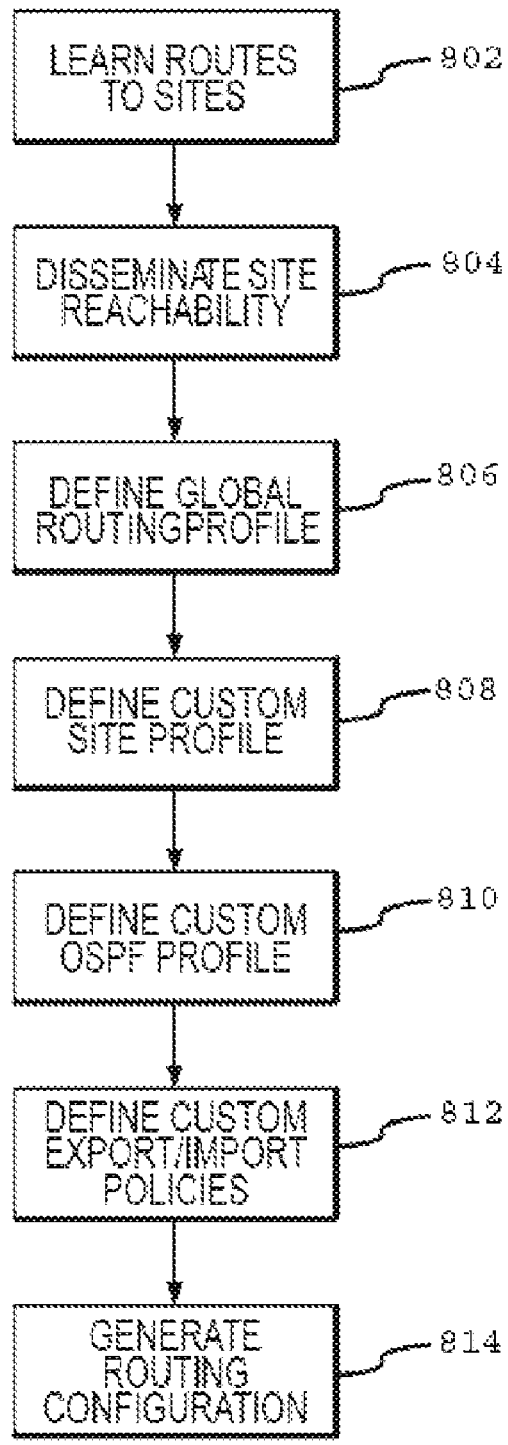
FIG. 8 is a flowchart illustrating a method for provisioning a router configuration according to an embodiment of the present invention.

In the previous section, a system-level overview of the operation of exemplary embodiments of the invention was provided. In this section, a process for automatically generating and provisioning routing configurations in accordance with a particular embodiment is described with reference to a flowchart shown in FIG. 8. The methods to be performed by the operating environment may constitute computer programs made up of computer-executable instructions. Describing the methods with reference to a flowchart enables one skilled in the art to develop such programs including such instructions to carry out the methods on suitable computers (the processor of the computer executing the instructions from computer-readable media). The method illustrated in FIG. 8 is inclusive of the acts required to be taken by an operating environment executing an exemplary embodiment of the invention.

The method begins at block 802 when a system executing the method learns, or discovers, the current routes to sites connected via the service processing switch 110 (FIG. 1). To build or include new sites in a VPN, each edge router must learn the routes to all sites connected to all the edges in the network. An edge in a network is a boundary between two routers, an edge router is typically a network device that routes data between one or more local area networks backbone network. Two components of routing information are typically needed for the VPN:

1) Site Reachability Information: Each edge router needs to learn the set of VPN addresses and address prefixes reachable at each site. The reachability information needed by the Customer Provided Equipment (CPE) router depends on site configuration. Customer sites are characterized into two categories: stub sites and non-stub sites. The CPE routers of stub sites have default routes pointing to an ISP edge router, while the CPE router of non-stub site do not, and therefore need to know the set of non-local destinations reachable via that link. Usually, if a VPN also provides Internet connectivity to a site and there is no backdoor connection between this and any other site, it is a stub site.

2) Intra-VPN Reachability Information: Once an edge router has learned the set of prefixes associated with each of its customer site's links, this information must be disseminated to each other router in the VPN.

According to the present example, after learning routes to sites, the system disseminates site reachability information (block 804). Various embodiments of the invention employ different mechanisms to disseminate the information. In one embodiment, static configuration is used. In static configuration, all the subnets associated with each customer site are manually configured into the VPN. To increase the manageability of this information, customer network management (CNM) 106 (FIG. 1) tools can be enhanced to allow customers to directly add and remove subnet information from the VPN. The subnet information can be used to automatically create the static routes in the VPN. In this case, the customer also needs to add static routes to the CPE routers of non-stub sites.

In an alternative embodiment, directory lookup is used to disseminate the site routing information. A central directory server can maintain the identities of edge routers associated with a VPN, and the set of customer site links bound to the VPN per edge router. Each edge router can query this information using some defined mechanism (for example, LDAP) upon startup. This mechanism requires some kind of database synchronization mechanism in order for all edge routers to learn the addition and deletion of sites from the VPN.

In a further alternative embodiment, a routing protocol can be run between the CPE edge router and the ISP edge router to exchange reachability information. This allows an ISP edge router to learn the prefixes that can be reached at a customer site, and enables a CPE router to learn the destinations that can be reached via the provider network.

In a still further embodiment, if a CPE router runs Multi-protocol Label Switching (MPLS), the MPLS Label Distribution Protocol (LDP) can be extended to convey the set of prefixes at each stub site, together with the appropriate labeling information.

In addition to the above, several mechanisms for Disseminating Intra-VPN Reachability Information can be used. In one embodiment employing static configuration, the service management system 118 can use the subnets configured for each site to automatically create static routes for dissemination of intra-VPN reachability information.

In an alternative embodiment, directory lookup information is used. In addition to VPN membership information, a central directory can maintain a listing of the address prefixes associated with each end point.

In a further alternative embodiment, each edge router runs an instance of a routing protocol on each VPN to disseminate intra-VPN reachability information. Using this mechanism, both full-mesh and arbitrary, VPN topologies can be easily supported.

A still further alternative embodiment uses a Link Reachability Protocol. Here each edge router can run a link reachability protocol carrying the necessary information. This protocol runs across the tunnel between the two edge routers. The two preferred choices for this approach are a variation of MPLS LDP and IBGP. The link reachability protocol-based schemes can support only fully meshed VPNs.

In yet a further alternative embodiment, site reach ability information is disseminated by Piggybacking on IP Backbone Routing Protocols. The set of address prefixes associated with each stub interface can also be piggybacked into the routing advertisements from each edge router and propagated through the network. Other edge routers extract this information from received route advertisements. This scheme typically requires that intermediate routers cache intra-VPN routing information to propagate the data further. This also has implications for the level of security possible for intra-VPN routing information.

In addition to learning and disseminating site reachability information, a global routing profile can be defined (block 806). In one embodiment of the invention, the global routing profile includes the following parameters:

a. Routing administration status
b. Routing protocol for Intra-VPN segments
c. Default routing protocol at the ISP edge. All the customer sites will generally inherit this.
d. Default site type: stub or non-stub: Stub sites have a default route going toward the ISP VPN (Internet). For stub sites, there is no need to export routes from the VPN. This information is used in creating default export and import policies.
e. If the routing protocol for the Intra-VPN segment is OSPF, define the OSPF profile topology type.

When a site is added, it inherits the routing configuration from the routing profile.

In addition, the system provides for the definition of a custom site profile (block 808). Multiple types of site information can be configured. First, if the site routing profile needs to be customized, the user may do so. Second, if a user wants static routing at the edge, the network subnets that are associated with the site must be provided. This configuration will allow the service management system to automatically create static routes. In one embodiment of the invention, the site profile contains following parameters:

a. Routing Protocol at the ISP edge
b. Site Type: stub or non-stub
c. OSPF Area ID: If OSPF is enabled at the edge
d. Site subnets.

In addition, a custom OSPF profile can be defined (block 810). When a user configures a routing profile, service management system 118 (FIG. 1) automatically generates OSPF, RIP, and static profiles, if needed. In many cases, the user will want to customize the generic OSPF profile. The user can customize the generated profile using a policy-based profile configuration workflow. The workflow includes the following features:

1) The user can define custom OSPF areas. He only needs to configure what VRs are included in what areas; Service management system 118 (FIG. 1) generates the required configuration for each VR and VI.
2) The user can define a route aggregation policy for an OSPF area; Service management system 118 (FIG. 1) will auto-generate this configuration for all the VRs in that area.
3) By default, Service management system 118 (FIG. 1) generates one VR routing parameter policy, which applies to all VRs, and three VI routing parameter policies which apply to tunnel interfaces, customer site edges, and VI-VI connections. When routing configuration is generated, these policies are used to define routing parameters. The user can make changes in any of these policies, or create his own policies and assign them as defaults. The user also can define policies and set them to be applied on a set of VRs or VIs. Service management system 118 (FIG. 1) allows users to individually customize parameters for a VR or VI.

When configuring OSPF for intra-VPN segment, the service management system cannot use the same guidelines as those used in setting up a normal OSPF network, because each router in a VPN is a virtual router. To optimize performance, it is desirable to minimize the size of the routing table. This can be accomplished by keeping the OSPF areas small. In a normal OSPF network, the network manager would not let the size of an OSPF area grow beyond 50-60 routers. With a VPN, it is desirable to not let the OSPF area grow beyond 20-25 VRs. The larger the OSPF area, the higher the load on each VR, and hence the fewer the VRs that can be created on the service processing switch. As a result, it is not desirable to make a complete mesh of all the VRs in a large VPN. The user should use a custom OSPF topology and create areas of reasonable size to ensure scalability and stability of the OSPF network.

The system also provides for the definition of custom export/import policies (block 812). Using the router and site profile defined above, service management system 118 (FIG. 1) generates default policies necessary for different routing protocols to talk to each other. In some situations, custom export and import policies are needed to control access to critical networks. The system allows users to add custom export and import policies.

Based on the site reachability information and/or the global and custom profiles described above, the service management system generates routing configuration (block 814). Described below are items that are considered during the generation of the configuration:

The user can only configure one protocol for the Intra-VPN segment. This configuration is used to configure the routing on all the interfaces that connect one VR to another in the same VPN. In most cases, this takes care of all tunnel interfaces.

If the user selects static routing for a site, service management system 118 (FIG. 1) will auto-generate one static route per site subnet on the local VR. If the routing for the Intra-VPN segment is also static, service management system 118 (FIG. 1) will also generate one static route per subnet on each remote VR. Auto-generation of static routes assumes a meshed-topology for the VPN. If the topology is not meshed, some additional configuration may be needed for the routing to work.

If select dynamic routing is selected for the Intra-VPN segment, service management system 118 (FIG. 1) auto-generates export policies to disseminate site reachability information to other VRs.

For a non-stub site that is using dynamic routing to communicate with the VPN, service management system 118 (FIG. 1) will create an export policy to inject all the routes learned from the Intra-VPN segment's routing into the customer network.

If the user selects a custom OSPF topology for the Intra-VPN segment, he does not have to explicitly assign an area 10 for each interface. Service management system 118 (FIG. 1) automatically interprets this information from the area configuration.

Once the profile is set, Service management system 118 (FIG. 1) automatically handles the routing configuration for the addition and deletion of VRs and VIs. For example, if standard OSPF routing has been selected for the Intra-VPN segment, whenever the user creates an IPSec tunnel connecting two VRs, OSPF will be enabled with area ID 0.0.0.0.

If a VPN is using only one routing protocol for the Intra-VPN segment, service management system 118 (FIG. 1) can discover routing profiles from the device configuration.

Service management system 118 (FIG. 1) supports explicit two-phase provisioning of routing profile configurations. In the first phase, the user makes changes to the routing profile and saves them in the database. In the second phase, the user commits the profile to the network. In this phase, the server translates delta changes in the profile configuration into a required low-level configuration and pushes it to appropriate devices.

Service management system 118 (FIG. 1) allows users to temporarily remove routing configurations from the device. Users can do this by providing administration status attributes for the routing profile. Setting this attribute to a "disabled" state and committing the profile removes configurations from the device. Routing can be turned on again by setting the admin status to "enabled."

As can be seen from the above, the generated and customized policies can act as templates that can be applied to particular VPNs, particular VRs, or groups of VRs. For example, assume an existing policy has been changed or further customized. In one embodiment of the invention, the user is presented with a list of VRs or VPNs that were configured with the existing policy. The user can then select the VRs to which the new policy should be applied.

Similarly, assume that the user wishes to change the policy for a particular VR. In one embodiment of the invention, the user selects the desired VR, and then selects a new policy to be applied to the VR. The new policy can then be applied immediately, or it can be applied at a later scheduled time.

In addition, the policies can be used as a differentiator in providing VPN services. If user selects STATIC routing for ISP-Edge and Intra-VPN segments, the service processing switch does not need to run any routing instances per customer VR. On the other hand, if a user has chosen to run dynamic routing for Intra-VPN and ISP edge segments, the switch may have to run instances of routing protocols such as OSPF and RIP. Running routing instances on virtual routers consumes both processing power and memory on the processing elements and blades. The demand on the resources will depend on the size of VPN and its interaction with various customer sites. An ISP can recover the cost of the increased resource usage, by using routing as a differentiator in providing VPN services. The following are a few exemplary methods of providing services:

1) Allow user to select the routing protocol per site: STATIC, RIP, or OSPF. Based on the site configuration, ISP can automatically configure routing protocol for intra-VPN segment. The cost of the service should be the lowest for STATIC and the highest for OSPF.

2) Define a few fixed routing profiles and sell them as a part of service packages such as Gold, Silver, and Bronze. For instance, Gold will allow user to select OSPF for intra-VPN as well as ISP edge segment. Silver will allow user to configure OSPF for intra-VPN segment, while RIP for ISPF edge. The bronze package will permit customer to configure STATIC for ISP edge as well as Intra-VPN segment.

3) Provide additional services as part of a profile. For example, include firewall, intrusion detection, network address translation, proxy services, or other network services as part of a differentiated service package. The service can then be included in profiles defined as part of the service package, and excluded from profiles for customers that do not pay for the service.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A computerized method for managing interworking protocols comprising the following computer-implemented steps:

a service management system (SMS), communicatively coupled with a plurality of service processing switches of a service provider, operable to automatically establish a logical network connection among a plurality of subscriber sites, using a policy-based provisioning methodology to provision subscriber interfaces of service processing switches associated with the plurality of subscriber sites based upon parameters of a predefined policy, the subscriber interfaces configured to communicate data in accordance with a first protocol, the parameters including one or more of a window size, a window timeout, a number of allowed bad events, an event window size and a keep-alive interval;

the SMS provisioning transport network interfaces of the service processing switches to provide a transport between the subscriber interfaces, the transport network interfaces communicating in accordance with a second protocol; and the SMS creating a first-protocol-over-second-protocol (FPoSP) Virtual Private Network (VPN) through which the plurality of subscriber sites securely exchange data by establishing a virtual router (VR) within the service processing switches corresponding to each subscriber interface, the VRs communicate the data between the service processing switches by encapsulating packets received from the plurality of subscriber sites within packets of the second protocol and transmitting the encapsulated packets through the transport network interfaces.

2. The computerized method of claim 1, wherein the first protocol comprises a frame relay protocol.

3. The computerized method of claim 1, wherein the second protocol comprises a Transmission Control Protocol/Internet Protocol (TCP/IP) protocol.

4. The computerized method of claim 1, wherein the second protocol comprises an Internet Protocol Security (IPSec) protocol.

5. The computerized method of claim 1, wherein the first protocol comprises an Asynchronous Transfer Mode (ATM) protocol.

6. The computerized method of claim 1, wherein said provisioning transport network interfaces utilizes the parameters from the predefined policy.

7. A service processing system comprising:

a first service processing switch including a first plurality of processing elements;

a second service processing switch including a second plurality of processing elements; and a service management system (SMS), communicably coupled to the first service processing switch and the second service processing switch, operable to automatically establish a logical network connection between subscriber sites associated with the first service processing switch and the second service processing switch by:

provisioning a first subscriber interface of the first service processing switch using a policy-based provisioning methodology based upon parameters of a predetermined policy definition, the first subscriber interface configured to communicate data in accordance with a first protocol, the parameters including one or more of a window size, a window timeout, a number of allowed bad events, an event window size and a keep-alive interval;

provisioning a second subscriber interface of the second service processing switch using the policy-based provisioning methodology based upon the parameters of the predetermined policy definition, the second subscriber interface configured to communicate data in accordance with the first protocol;

provisioning transport network interfaces of the first service processing switch and the second service processing switch to provide a transport between the first subscriber interface and the second subscriber interface, the transport network interfaces communicating in accordance with a second protocol; and creating a first-protocol-over-second-protocol (FPoSP) Virtual Private Network (VPN) through which the subscriber sites securely exchange data by establishing a first virtual router (VR) corresponding to the first subscriber interface and a second VR corresponding to the second subscriber interface, the first VR and the second VR communicate the data between the first service processing switch and the second service processing switch by encapsulating packets received from the subscriber sites within packets of the second protocol and transmitting the encapsulated packets through the transport network interfaces.

8. The service processing system of claim 7, wherein the first protocol comprises a frame relay protocol.

9. The service processing system of claim 7, wherein the second protocol comprises a Transmission Control Protocol/Internet Protocol (TCP/IP) protocol.

10. The service processing system of claim 7, wherein the second protocol comprises an Internet Protocol Security (IPSec) protocol.

11. The service processing system of claim 7, wherein the first protocol comprises an Asynchronous Transfer Mode (ATM) protocol.

12. A non-transitory computer-readable storage medium having stored thereon instructions, which when executed by one or more processors of a service management system (SMS) of a service provider that is operable to automatically establish a logical network connection among a plurality of subscriber sites through a plurality of service processing switches to which the SMS is communicatively coupled, cause a method to be performed comprising the following computer-implemented steps:

provisioning subscriber interfaces of the plurality of service processing switches using a policy-based provisioning methodology based upon parameters of a predefined policy, the subscriber interfaces configured to communicate data with corresponding subscriber sites of the plurality of subscriber sites in accordance with a first protocol, the parameters including one or more of a window size, a window timeout, a number of allowed bad events, an event window size and a keep-alive interval;

provisioning transport network interfaces of the plurality of service processing switches to provide a transport between the subscriber interfaces, the transport network interfaces communicating in accordance with a second protocol; and creating a first-protocol-over-second-protocol (FPoSP) Virtual Private Network (VPN) through which the plurality of subscriber sites securely exchange data by establishing a virtual router (VR) within the plurality of service processing switches for each of the subscriber interfaces, the VRs communicate the data between the plurality of service processing switches by encapsulating packets received from the plurality of subscriber sites within packets of the second protocol and transmitting the encapsulated packets through the transport network interfaces.

13. The non-transitory computer-readable storage medium of claim 12, wherein the first protocol comprises a frame relay protocol.

14. The non-transitory computer-readable storage medium of claim 12, wherein the second protocol comprises a Transmission Control Protocol/Internet Protocol (TCP/IP) protocol.

15. The non-transitory computer-readable storage medium of claim 12, wherein the second protocol comprises an Internet Protocol Security (IPSec) protocol.

16. The non-transitory computer-readable storage medium of claim 12, wherein the first protocol comprises an Asynchronous Transfer Mode (ATM) protocol.

* * * * *